United States Patent
Gu et al.

(10) Patent No.: US 7,846,591 B2
(45) Date of Patent: Dec. 7, 2010

(54) WATER MANAGEMENT LAYER ON FLOWFIELD IN PEM FUEL CELL

(75) Inventors: Wenbin Gu, Pittsford, NY (US); Gerald W Fly, Geneseo, NY (US); Mark F Mathias, Pittsford, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 10/780,025

(22) Filed: Feb. 17, 2004

(65) Prior Publication Data

US 2005/0181264 A1    Aug. 18, 2005

(51) Int. Cl.
H01M 8/24 (2006.01)
H01M 8/02 (2006.01)

(52) U.S. Cl. .................. 429/414; 429/457; 429/518

(58) Field of Classification Search ............ 429/34, 429/38, 39
See application file for complete search history.

(56) References Cited

U.S. PATENT DOCUMENTS

| | | |
|---|---|---|
| 4,769,297 A | 9/1988 | Reiser et al. |
| 5,108,849 A | 4/1992 | Watkins et al. |
| 5,322,744 A | 6/1994 | Koseki et al. |
| 5,432,023 A * | 7/1995 | Yamada et al. ............ 429/34 |
| 5,503,944 A | 4/1996 | Meyer et al. |
| 5,686,199 A | 11/1997 | Cavalca et al. |
| 5,776,625 A | 7/1998 | Kaufman et al. |
| 5,840,414 A | 11/1998 | Bett et al. |
| 5,853,909 A | 12/1998 | Reiser |
| 5,981,098 A | 11/1999 | Vitale |
| 6,066,408 A | 5/2000 | Vitale et al. |
| 6,099,984 A | 8/2000 | Rock |
| 6,117,577 A | 9/2000 | Wilson |
| 6,197,442 B1 | 3/2001 | Gorman |
| 6,258,476 B1 | 7/2001 | Cipollini |
| 6,303,245 B1 | 10/2001 | Nelson |

(Continued)

FOREIGN PATENT DOCUMENTS

WO    WO 96/12316    10/1995

(Continued)

OTHER PUBLICATIONS

Nguyentat, T., Diffusion bonding—An Advanced Material Process for Aerospace Technology, http://www.vacets.org/vtic97/ttnguyen.htm.

(Continued)

*Primary Examiner*—Keith Walker
(74) *Attorney, Agent, or Firm*—Harness, Dickey & Pierce, P.L.C.

(57) ABSTRACT

The present invention is directed to an electroconductive element within an electrochemical cell that improves water management. The electroconductive element comprises an impermeable electrically conductive element and a porous liquid distribution media disposed along a major surface of the conductive element. Preferably, the liquid distribution media is in direct contact and fluid communication with a fluid distribution layer disposed between the membrane electrode assembly (MEA) and the liquid distribution media, so that liquids are drawn from the MEA through the fluid distribution layer to and through the liquid distribution media. The liquid distribution media transports liquids away from the MEA in the fuel cell. Methods of fabricating and operating fuel cells and electroconductive elements according to the present invention are also contemplated.

42 Claims, 6 Drawing Sheets

U.S. PATENT DOCUMENTS

| | | |
|---|---|---|
| 6,358,642 B1 | 3/2002 | Griffith et al. |
| 6,376,111 B1 | 4/2002 | Mathias et al. |
| 6,485,854 B1 | 11/2002 | Grover et al. |
| 6,555,262 B1 | 4/2003 | Kaiser et al. |
| 2002/0001743 A1* | 1/2002 | Davis .......................... 429/34 |
| 2002/0192539 A1 | 12/2002 | Kobayashi et al. |
| 2003/0235735 A1* | 12/2003 | Miyazawa et al. ............ 429/26 |

OTHER PUBLICATIONS

Qi, Z. et al., "PEM fuel cell stacks operated under dry-reactant conditions," Journal of Power Sources, 109 (2002) 469-476.

"Metpore®" Datasheet, http://www.porvairfuelcells.com/index2.htm, Feb. 12, 2004.

\* cited by examiner

WATER MANAGEMENT LAYER ON FLOWFIELD IN PEM FUEL CELL

FIELD OF THE INVENTION

The present invention relates to an electrochemical fuel cell, and more particularly to an electroconductive element within a fuel cell and methods for producing the electroconductive element.

BACKGROUND OF THE INVENTION

Fuel cells have been proposed as a power source for electric vehicles and other applications. An exemplary fuel cell has a membrane electrode assembly (MEA) with catalytic electrodes and a proton exchange membrane (PEM) sandwiched therebetween. Electricity is generated by the electrochemical reactions between hydrogen and oxygen occurring within the MEA. Water (also known as product water) is also generated at the cathode electrode during such electrochemical reactions. The MEA is sandwiched between a pair of electrically conductive contact elements, commonly referred to as bipolar plates, which serve to collect electrical current from the anode and cathode, and which contain appropriate channels and openings for distributing the fuel cell's gaseous reactants (i.e., $H_2$ & $O_2$/air) over the surfaces of the respective anode and cathode. Often, gas diffusion media (porous conductive carbon graphite paper) is placed between each electroconductive element and the respective electrodes of the MEA to further facilitate gas reactant delivery. Efficient operation of a fuel cell depends on the ability to provide effective water management in the system, and more specifically to control transport of water to prevent localized flooding and provide uniform humidification critical to the MEA durability. However, there remains the need for effective means to accomplish this. Thus, it is desirable to provide a water management system that enhances operational efficiency and durability of the MEA.

SUMMARY OF THE INVENTION

The present invention provides an electrochemical cell having a membrane electrode assembly (MEA) comprising an anode and a cathode, the cell comprising an electroconductive element comprising an impermeable electrically conductive element having a major surface facing the cathode. The impermeable electroconductive element has a porous liquid distribution media disposed along the major surface defining flow channels at the major surface for transporting gas and liquid to and from the cathode. Further, an electrically conductive fluid distribution layer is disposed between the liquid distribution media and the cathode for transporting gases and liquids between the cathode and the flow channels. The fluid distribution layer and liquid distribution media are constructed and arranged to transport liquids accumulating within the cathode through the fluid distribution layer and to and through the liquid distribution media.

In alternate preferred embodiments, the present invention provides an electroconductive element plate for an electrochemical fuel cell, comprising an impermeable electrically conductive element having a major surface and a conductive porous hydrophilic layer on the element along the major surface. The porous layer is hydrophilic and transports water from regions of relatively high liquid concentration to regions of relatively low liquid concentration within the layer.

In other preferred embodiments, the present invention relates to methods of making an electroconductive element for an electrochemical fuel cell, comprising providing an impermeable electrically conductive element having a major surface, applying a precursor of a liquid distribution media to the major surface; and then treating the precursor to form a hydrophilic liquid distribution media that is adhered to the major surface.

In alternate preferred embodiments of the present invention a method is provided for distributing water within an electrochemical fuel cell comprising introducing reactant gases to respective anode and cathode sides of a membrane electrode assembly (MEA) and conducting an electrochemical reaction in the MEA thereby generating water on the cathode side. Water is transported away from the cathode side by uptake of water in a porous fluid distribution element in contact with the cathode, thus transferring the transported water to a liquid distribution media contacting the fluid distribution element, and distributing the transferred water with the liquid distribution media to wet relatively dry areas of the liquid distribution media.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention contemplates an improved water management system within an electrochemical fuel cell, and is directed to an electroconductive element (e.g. a bipolar plate in a fuel cell stack) that is comprised of an impermeable electrically conductive element and a porous liquid distribution media disposed along a major surface of the conductive element. The major surface faces a membrane electrode assembly (MEA) where the liquids are generated and/or accumulated. The liquid distribution media transports liquids away from the MEA. Preferably, the liquid distribution media is in direct contact and fluid communication with a fluid distribution layer disposed between the MEA and the liquid distribution media, and liquids are drawn from the MEA through the fluid distribution layer to the liquid distribution media. First, to better understand the present invention, a description of an exemplary fuel cell and stack are provided herein.

Figure 1:
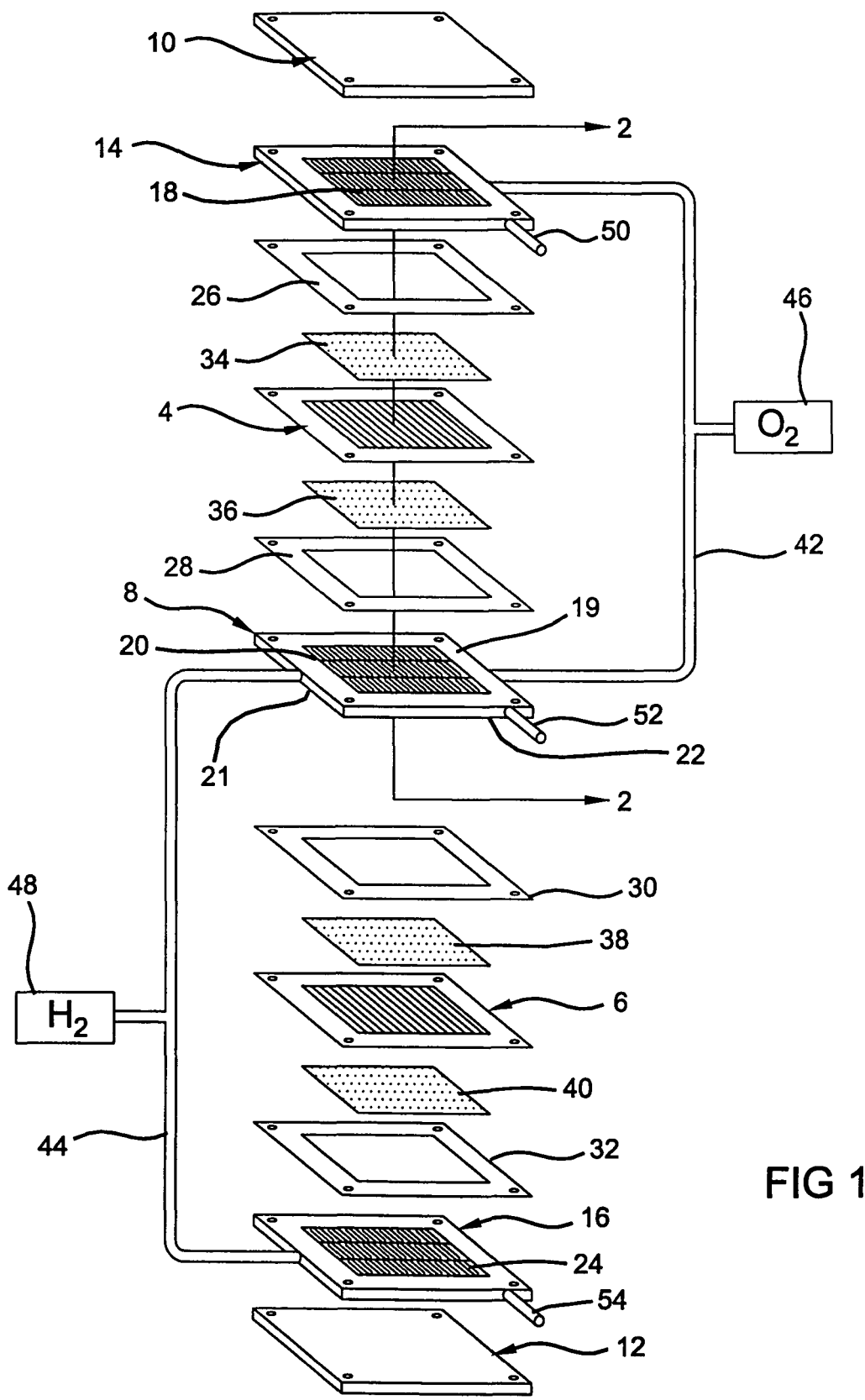
FIG. 1 is a schematic illustration of two cells in a liquid-cooled PEM fuel cell stack.

FIG. 1 depicts two individual proton exchange membrane (PEM) fuel cells connected to form a stack having a pair of membrane-electrode-assemblies (MEAs) 4 and 6 separated from each other by an electrically conductive, liquid-cooled, bipolar separator plate 8. An individual fuel cell, which is not connected in series within a stack, has a separator plate 8 with a single electrically active side. In a stack with multiple fuel cells, a preferred bipolar separator plate 8 typically has two electrically active sides 19, 21 within the stack, each active side 19, 21 respectively facing a separate MEA 4, 6 with opposite charges that are separated, hence the so-called "bipolar" plate. As used herein, the term "electroconductive element" generally refers to bipolar separator plate assemblies comprising two separator plate elements attached to one another, as well as to single separator plates, which are generally used as a separator plate and collector element within a single fuel cell (e.g. the anode and cathode plates), or at the end plates of respective anode and cathode terminal ends of a large fuel cell stack.

The MEAs 4,6 and bipolar plate 8 are stacked together between stainless steel clamping plates 10,12 and end contact elements 14,16. The end contact elements 14,16 as well as both working faces of the bipolar plate 8 contain a plurality of grooves or channels 18, 20, 22, and 24 for distributing fuel and oxidant gases (i.e., $H_2$ & $O_2$) to the MEAs 4,6. Nonconductive gaskets or seals 26, 28, 30, and 32 provide seals and electrical insulation between the several components of the fuel cell stack. Porous conductive diffusion media layers 34, 36, 38 and 40 press up against the electrode faces of the MEAs 4, 6. Such electrically conductive porous diffusion media layers, may be constructed of woven graphite, graphitized sheets, or carbon paper that facilitate dispersion of the reactants over the surface of the electrodes and hence over the membrane facing the electrode. Conductive gas diffusion media layers are well known in the art, such as the commercially available TORAY® graphite-fiber paper made by Toray Carbon Fibers America, Inc. The end contact elements 14,16 press up against the gas diffusion layers 34,40 respectively, while the bipolar plate 8 presses up against gas diffusion media layer 36 on an anode electrode face 19 of the MEA 4, and against gas diffusion media layer 38 on a cathode electrode face 21 of MEA 6. Hydrogen gas is introduced at the anode 19 via supply plumbing 44 connected to a storage device 48. Oxygen or air is introduced at the cathode 21 via appropriate supply plumbing 42, where it is flows into the porous electrode. Air may be supplied to the cathode 21 from the ambient, and hydrogen to the anode 19 from a methanol or gasoline reformer, or the like. Exhaust plumbing (not shown) for both the $H_2$ and $O_2$/air sides of the MEAs 4,6 will also be provided. Additional plumbing 50, 52, 54 is provided for circulating coolant through the bipolar plate 8 and end plates 14,16.

Figure 2:
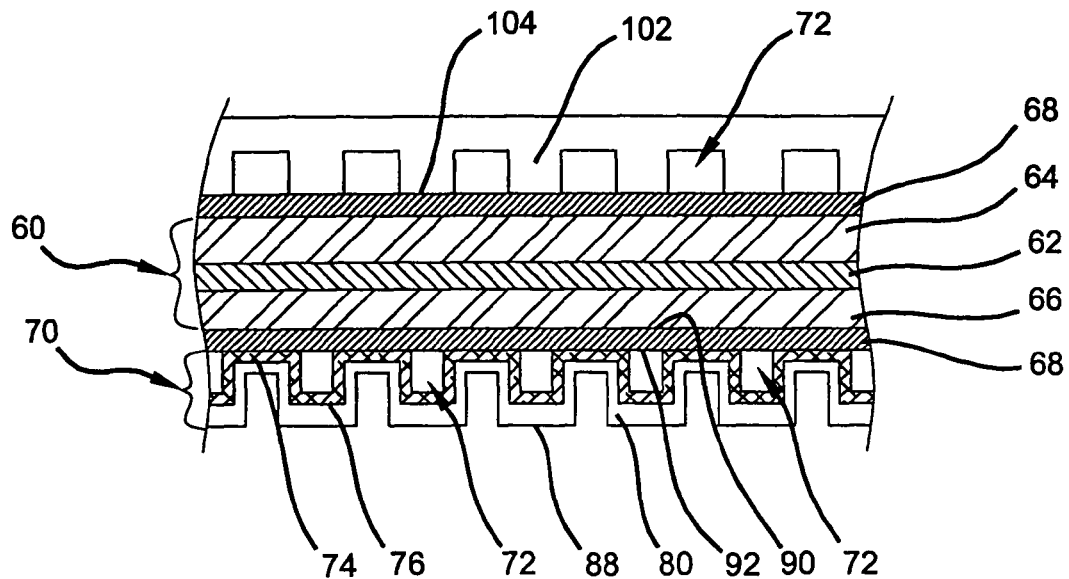
FIG. 2 is a partial cross-sectional view taken along line 2-2 of FIG. 1 showing one preferred embodiment of the present invention of a membrane electrode assembly (MEA) sandwiched by two electroconductive elements, one of the electroconductive elements comprising a liquid distribution media and an impermeable electrically conductive plate.

One preferred embodiment of the present invention is shown in FIG. 2, where an MEA 60 comprises a membrane (PEM) 62 surrounded by an anode 64 and a cathode 66. With the present invention, an electrically conductive fluid distribution layer 68 serves as a conduit both for gases entering and exiting the fuel cell, as well as a conduit for liquids entering and exiting the fuel cell. One aspect of the present invention provides improved redistribution of liquids to provide more uniform humidification of the membrane 62 and catalyst layers 64,66, as will be described in greater detail below. The fluid distribution layers 68 are adjacent to and confront the anode 64 and cathode 66 of the MEA 60, respectively. The fluid distribution layer 68 is adjacent to an electroconductive element 70 along the cathode 66 of the MEA 60, according to one preferred embodiment of the present invention.

Figure 3:
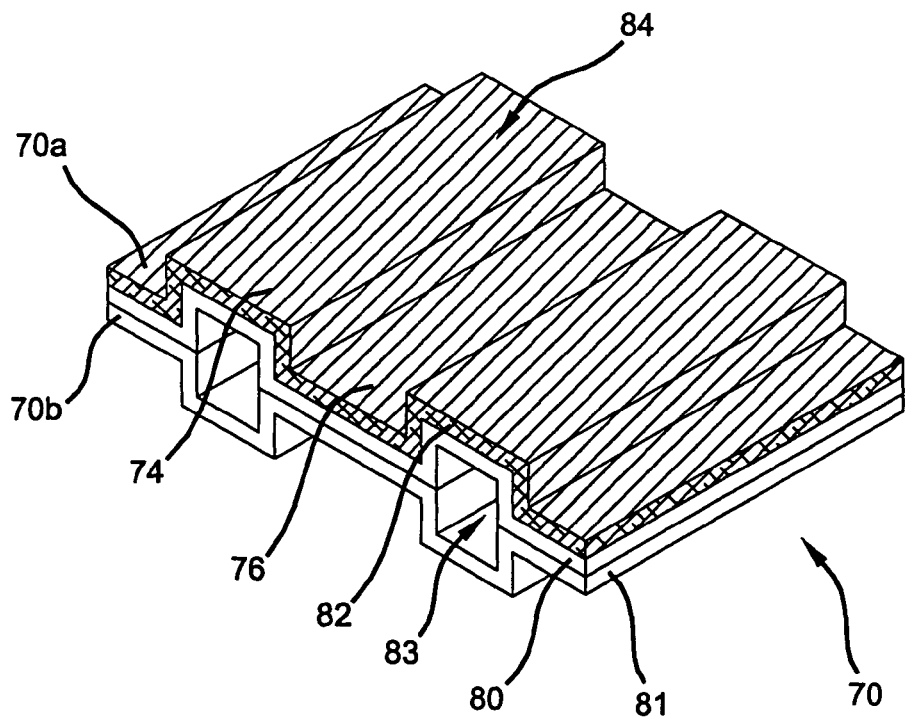
FIG. 3 is a partial isometric view of an exemplary electroconductive element (bi-polar plate assembly) comprising two electrically conductive plates attached to one another, where one plate comprises an impermeable electrically conductive plate and a liquid distribution media in accordance with one preferred embodiment of the present invention.

FIG. 3 shows an electroconductive element 70 as a bipolar plate assembly comprising an upper element plate 70a and a lower element plate 70b. As shown, the upper plate 70a is prepared in accordance with the embodiment shown in FIG. 2, and has a major surface 84. As shown in FIG. 2, the electroconductive element 70 faces the cathode 66 and confronts the fluid distribution layer 68.

In a typical fuel cell, the MEA 60 comprises the membrane 62, which is a proton exchange membrane (PEM) 62 sandwiched between the anode 64 and the cathode 66 electrodes. The membrane (PEM) 62 typically comprises an ionic exchange resin, such as a perfluorosulfonate ionomer membrane. One such commercially available membrane is the proton conductive membrane sold by E.I. DuPont De Nemours & Co. under the trade name NAFION®.

The anode 64 and cathode 66 typically comprise porous conductive materials with catalytic particles distributed therein, to facilitate the electrochemical reaction of the oxygen in the cathode and the hydrogen in the anode. The anode 64 and cathode 66 typically comprise finely divided carbon particles, having very finely divided catalytic particles supported on the surfaces of the carbon particles, and proton conductive material intermingled with the catalytic and carbon particles. At the anode 64, each hydrogen ($H_2$) molecule is split into two protons ($H^+$), freeing two electrons. The protons migrate across the PEM 62 to the cathode 66. Catalyst particles within the cathode 66 facilitate a reaction between the protons ($H^+$) and oxygen ($O_2$), to form water within the electrode. As the reactant gas flows into the porous cathode 66 to react, liquid product water is generated and must be simultaneously removed from the cathode 66. Otherwise, the electrode 66 has the potential to "flood" with liquid. Flooding impedes gas flow to the cathode 66, in effect decreasing or ceasing any reactions occurring in the electrode.

Preferably, the major surface 84 of the electroconductive element 70 is formed to have an undulated configuration comprising a plurality of peaks and valleys. The peaks correspond to a plurality of lands 74 which define therebetween the plurality of valleys, which correspond to grooves 76. Thus, underlying each groove 76 is a land 88 on an opposite side to the major surface 84 of the electroconductive element 70. The lands and grooves 74,76 will cover the entire major surface 84 of the impermeable electrically conductive element 80 that engages the fluid distribution layer 68. When the fuel cell is fully assembled, the lands 74 press against the fluid distribution layer 68, which, in turn, presses against the MEA 60. This surface configuration forms the flow field of gas flow channels 72 through which the fuel cell's reactant gases (i.e., $H_2$ or $O_2$) flow in a tortuous path from an inlet to an outlet side (not shown) of the electroconductive element 70. As appreciated by one of skill in the art, an undulated surface may comprise a variety of shapes, including trapezoidal, rectangular, triangular, waved, or serrated, so that flow channels 72 may be formed in a trough or valley between peaks. Gases flow into and out of the fluid distribution layer 68 into the MEA 60 via the gas flow channels 72. Further, the fluid distribution layer 68 also transports liquids to or away from the MEA 60.

Typical water management in a fuel cell relies on gas circulation to remove the product water. The hydrophobicity of the fluid distribution layer 68 causes water to be forced out of the fluid distribution layer 68 and into the flow channels 72. High velocity gas streams may entrain the liquids, or if the gas stream is unsaturated, the liquid may vaporize, and thus be transported out of the fuel cell. Preferred fuel cells have the porous fluid distribution layer 68 adjacent to the electrodes 64,66 to transfer both gas and liquid to and from the electrodes 64,66. In the case of the cathode 66, the fluid distribution layer 68 draws the product water away from the electrode 66. Removal of the product water is especially effective when the gases flowing into and out of the cathode 66 through the gas flow channels 72 (and likewise the fluid distribution layer 68) are undersaturated.

It has been found that performance of the PEM fuel cell is sensitive to hydration levels of the MEA 60. Often a fully humidified or saturated gas stream is employed. Thus, fully humidified gas streams enable high proton conductivity and good membrane durability, resulting in increased fuel cell efficiency and a longer lifespan for the MEA 60. A dry MEA 60 results in significantly reduced performance and shortened lifetime. As a result, fuel cell systems generally include humidifying equipment for humidifying dry air entering the cathode 66 of the PEM fuel cell. Yet, when the gases are fully saturated, the liquid product water tends to accumulate in the cathode electrode 66 and the fluid distribution layer 68. The accumulation of the product water yields significant mass transfer resistance for gaseous reactant access to the cathode electrode 66; may result in potential operational inefficiency and flooding conditions; and may provide a mechanism for MEA 60 degradation.

Liquid removal may also be achieved by a high gas stream velocity. Under low load conditions (e.g. start-up or transient conditions), when there is low reactant flow, gas flow velocity is often insufficient to achieve the necessary liquid entrainment. Further, during steady state operations, liquids may accumulate in stagnant areas, such as the portion of the fluid distribution layer 68 above the lands 74, where there is little or no convective gas flow to remove water near the cathode 66. Conversely, some areas may be exposed to dry gases for extended periods of time. Thus, the humidification of the MEA 60 may be highly non-uniform. The present invention contemplates a water management system on the electroconductive element 70 in a fuel cell that enhances water removal from the electrodes 64,66 and fluid distribution layer 68 by transporting water to and through a liquid distribution media 82 along the electroconductive element 70 to enhance fuel cell operation by reducing potential flooding of the electrode 66 and fluid distribution layer 68 in some regions and localized drying of the MEA 60 in other regions. An effective water management system according to the present invention, dramatically increases the fuel cell efficiency and lengthens its lifespan.

The bipolar plate electroconductive element 70 according to preferred embodiments of the present invention, is comprised of an impermeable electrically conductive element 80 which is overlaid with the liquid distribution media 82, as best shown by the first plate 70a in FIG. 3. The electroconductive element 70 is electrically active in the area which coincides to the area occupied by the MEA 60, and conducts the electrical charge in a conductive pathway from the cathode 66 of the fuel cell. As shown in FIG. 3, in certain preferred embodiments of the present invention, the electroconductive element 70 is be formed as an entire bipolar plate assembly comprising a first and second plate 70a, 70b, where a first impermeable electrically conductive element (like 80 shown in FIG. 2) is attached to a second impermeable element 81, and coolant flow channels 83 are formed between the two impermeable elements 80,81. In such an embodiment, the second impermeable element 81 of the second plate 70b would face an anode (not shown) of another fuel cell.

The impermeable electrically conductive element 80 comprises a solid conductive body. The impermeable electrically conductive layer 80 is impervious to both fluid and gas flow, thus providing a physical barrier between the several fuel cells, or at the terminal end of the stack. The impermeable electrically conductive element 80 may be constructed of conductive materials known in the art. These conductive materials may include metals, such as for example, aluminum, titanium, stainless steels, and their alloys, graphite, C/C composites, or polymeric composite materials having a matrix of conductive particles. The impermeable electrically conductive element 80, is often constructed of metal, typically a sheet fabricated as thinly as possible (e.g., about 0.002-0.02 inches thick). The metal sheet may be formed by stamping, by photo etching (i.e., through a photolithographic mask) or any other conventional metal fabrication process. In alternate preferred embodiments, the impermeable electrically conductive element 80 may be constructed of a conductive polymeric matrix, having conductive particles dispersed in a polymeric resin. Such resins may include thermoset and thermoplastic resins. Such a polymer resin preferably comprises any polymer that is water-insoluble when cross-linked or cured or solidified and can withstand the hostile oxidative and acidic environment of the fuel cell. One example of an impermeable electrically conductive element 80 constructed of polymeric matrices is disclosed in commonly owned patent application Ser. No. 10/383,500 filed on Mar. 7, 2003.

In addition to the impermeable electrically conductive element 80, the electroconductive element 70 further comprises the liquid distribution media 82 along the major surface 84. The liquid distribution media 82 is preferably a porous hydrophilic layer that transports water away from the fluid distribution layer 68 and cathode 66 (FIG. 2). The liquid distribution media 82 serves multiple functions. One such function is to drain any water accumulated within the cathode 66 (and thus from the corresponding areas of the fluid distribution layer 68). This enables liquid accumulating in stagnant areas of the cathode 66 and fluid distribution layer 68, such as those in contact with the lands 74, to be drained to prevent localized flooding. One preferred aspect of the present invention includes the ability to move the water or liquid over the entire major surface 84 of electroconductive element 70, by non-mechanical means (i.e. by wicking action facilitated by the capillary forces within the liquid distribution media 82, without need for an external pumping or pressurization) to allow for regulation of the liquid along the cathode face of the MEA 60 and within the cell. The regulation of liquid transport is achieved by equilibrium driving forces between relatively dry and wet areas within the wicking material in the liquid distribution media 82. Liquids are wicked away from areas of high concentration to areas of lower concentration along the liquid distribution media 82. Such capillary action in the liquid distribution media 82 often occurs against gas flow and achieves uniform water distribution over the electroconductive element 70, and thus lowers the ionic ohmic loss in the membrane 62 and cathode electrode 66 and improves cell performance.

Another preferred aspect of the liquid distribution media 82 includes a greater gas-liquid interface zone, which occurs due to the high surface area of the porous liquid distribution media 82 that lines the gas flow channels 72. Thus, when liquids are moved to relatively drier regions within the liquid distribution media 82, it is generally into the gas flow channels 72, where a greater gas-liquid interface in a region of convective gas flow facilitates greater evaporation or entrainment. Additionally, the hydrophilic liquid distribution media 82 layer enables better separation of liquid from gas, permitting separate transport paths for reactant entry and product exit. As a result, the mass transfer resistance due to the presence of liquid water within the fluid distribution layer 68 and cathode 66 is significantly reduced, because a greater portion of the pores are open to gas flow, rather than being occupied by liquid molecules. Thus, the liquid distribution media 82 facilitates improved ingress of gas reactants into and egress of liquid out of the fuel cell.

Figure 4:
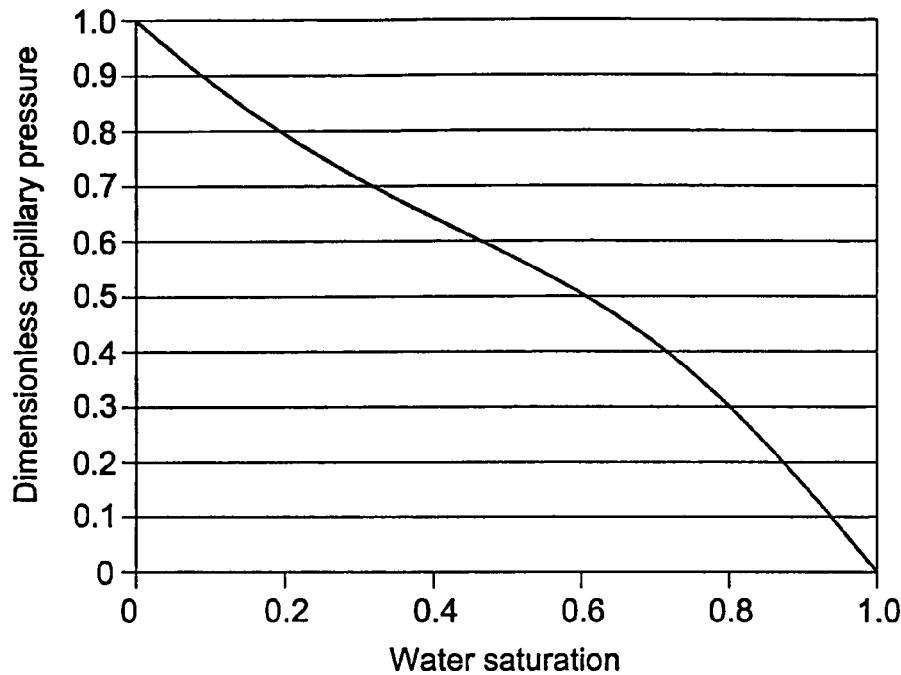
FIG. 4 is a graph showing water saturation versus dimensionless capillary pressure for a porous material.

The liquid distribution media 82 selected for the present invention is preferably a conductive porous material that wicks liquid by capillary action. A porous material has a capillary action wicking rate, which is dependent upon both the pore size and permeability of the material. The mass flux ($m_l$) of working fluid flowing in a porous capillary layer is determined by $$m_l = \frac{K_l}{v_l} \cdot \left( \frac{\Delta p_c - \Delta p_g}{L} \right) \quad \text{(Equation 1)}$$

where $K_l$ is the permeability of the capillary layer in the presence of a liquid working fluid; $v_l$ is the dynamic viscosity of the liquid; $p_g$ is the gas phase pressure; $p_c$ is the capillary pressure; and L is the transport length. The capillary pressure ($p_c$) is generally determined in a porous material by the following equation $$p_c = \frac{A \sigma \cos\theta_c}{d} \cdot f(s) \quad \text{(Equation 2)}$$

and the permeability of the capillary layer $K_l$ is given by $$K_l = \left[ \frac{d^2 \cdot \varepsilon^3}{B \cdot (1-\varepsilon)^2} \right] \cdot s^n \quad \text{(Equation 3)}$$

where σ is the surface tension of the liquid, $\theta_c$ is the contact angle between the liquid and the surface it contacts (where a value of zero denotes that the surface is completely hydrophilic to the liquid), d is the pore size diameter; s is the liquid saturation level defined by the ratio of the volume fraction of liquid to the porosity, and ε is defined by $$\varepsilon = \frac{\text{void volume in material}}{\text{total volume of material (solids + voids)}} \quad \text{(Equation 4)}$$

where A and B are constants related to pore structure and the shape of particles that form the capillary layer. In Equation 2, f(s) is known as the dimensionless capillary pressure which is a function of s. The dimensionless capillary pressure f(s) is plotted versus water saturation value in FIG. 4, for a porous material having spherical particles. The dimensionless capillary pressure f(s) value ranges from 1 to 0 (as s correspondingly increases from 0 to 1), meaning that capillary force would vanish if the porous material is fully saturated by the liquid.

In Equation 3, the formula inside the brackets stands for the absolute permeability of a porous medium in the absence of liquid, and $s^n$ is considered the relative permeability of the porous medium in the presence of liquid, in which n reflects the effect of gas-liquid interaction. Further, $K_l$ and $p_c$ are dependent on pore size, where $K_l$ increases as pore size is increased, and $p_c$ increases as pore size is reduced. As can be observed, there exists an optimal pore size that creates a capillary pressure that is sufficiently large to establish a desired mass flux of working fluid, and which permits liquid to flow against a gas pressure gradient across the flowfield. Thus, in order to facilitate mass flux across the liquid distribution media, the pore size is preferably of a size that permits uniform distribution of liquids over the entire active area by means of capillary driven flow.

Pore size selection for the liquid distribution media 82 may be dependent on the range of differential pressures across the flow field. Internal pores are referred to as micropores and external pores as mesopores. As used herein, the terms "pore" and "pores" refers to both mesopores and micropores and "pore size" refers to an average or median value including both the internal and external pore diameter sizes. It is preferred that the average pore size be equivalent to a radius of greater than about 0.2 μm and less than about 30 μm. Selection of the liquid distribution media 82 material optimizes the pore size to increase the mass flux to a maximum amount, over the range of pressure differentials encountered during operating conditions. Tolerance levels for the differential pressure across the flow field are determined by various system parameters including membrane 62 integrity, partial pressures of reactants, and system handling capability.

Figure 5:
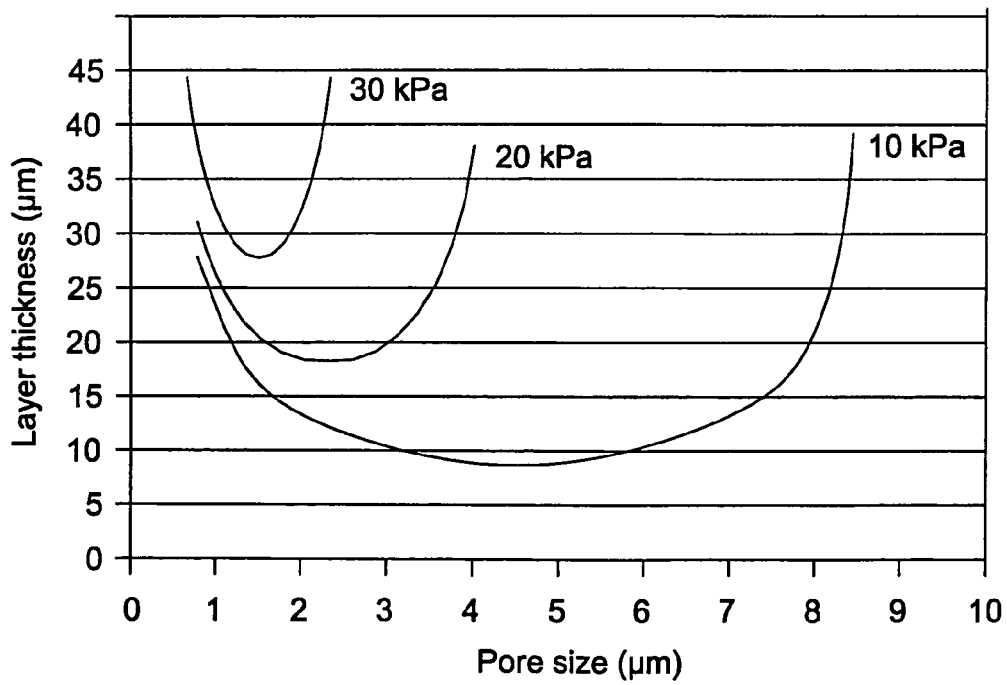
FIG. 5 is a graph showing the layer thickness versus pore size for a porous liquid distribution media in a fuel cell.

The width and height of the liquid distribution media 82 also impacts the mass flux and electrical resistance. As the thickness of the liquid distribution layer 82 decreases or the length of the liquid distribution media 82 increases, transport of the water through the bulk of the material becomes increasingly difficult. The general relationship between pore size and layer thickness is shown in FIG. 5. In developing FIG. 5, the fuel cell was operated at a temperature of 70° C., the applied current density was 1.2 A/cm², the gas pressure drop was varied from 10 to 30 kPa; the dimensionless capillary pressure difference was 0.3, water saturation value s was 0.8, and the void fraction ε was 0.5. FIG. 5 indicates that the range of pore sizes widens for a given liquid distribution layer 82 thickness as the gas pressure drop decreases. In selecting the liquid distribution media thickness, assessment of the thickness of the material is balanced with the pore size (and hence capillary pressure and hydrophilic properties). As can be observed, a minimum thickness exists for the liquid distribution layer 82. Further, in selecting a liquid distribution media 82 thickness, it is desirable to optimize the capillary pressure versus the permeability determined by pore size. Thus, δ is the minimum thickness of the liquid distribution layer determined by maximizing water flow through it. Namely, δ is determined by the following $$\delta = \frac{\frac{I}{2F} \cdot (W_C + W_L) \cdot MW_{H_2O}}{\rho_l \cdot \frac{K \cdot s^n}{\mu_l} \cdot \frac{\left[\frac{A\sigma \cos\Theta_c}{d} \cdot \Delta f(s) - \Delta p_g\right]}{\left[\frac{(W_c + W_L)}{2} = D_c\right]}}$$

(Equation 5)

(Equation 5). In Equation 5, I is the maximum current of the fuel cell; F is Faraday's constant equal to 96,487 C/mol; $W_c$ is the width of channel; $W_L$ is the width of land, $MW_{H_2O}$ is the molecular weight of water equal to approximately 18 g/mol, $\rho_l$ is the density of the liquid, $\mu_l$ is the viscosity of the liquid, and $D_c$ is so-called capillary diffusion coefficient. Depending on the mass flux for a given material, the material thickness may be greater for larger mass flux rates and thinner for smaller mass flux rates, with the ultimate objective of ensuring even distribution of the liquid throughout the liquid distribution media 82 during operating conditions. Thus, with a preferred pore size of between 3 to 6 μm, the minimum layer thickness is 10 μm for a gas pressure drop of 10 kPa. A preferred thickness for the liquid distribution media 82 of the electroconductive element 70 according to the present invention is between about 3 μm to about 50 μm where the liquid distribution layer 82 is applied onto the electroconductive element plate 70. For plates where the liquid distribution layer 82 is part of the structure of the plate 70, thicknesses can be as high as 3 mm.

Further, the liquid distribution media 82 material is selected to have a relatively low electrical resistance to enhance electrical conductivity through the electroconductive element plate 70. It is preferred that the electrical resistance of the liquid distribution media 82 does not exceed about 25 mΩ-cm², including contact resistance between the liquid distribution layer 82 and the fluid distribution layer 68. Thus, factors that are important in the selection process of liquid distribution media 82 material include the wicking capability or rate of liquid mass transport of the material determined by the pore size (and permeability) which indicates whether the material efficiently transports water under pressurized conditions, as well as the electrical conductivity.

In preferred embodiments of the present invention, the liquid distribution media 82 is in contact with the fluid distribution layer 68. The fluid distribution layer 68 contacts the cathode 66 (or electrode) on a first side 90 opposite to a second side 92 in contact with the liquid distribution media 82. The fluid distribution layer 68 is preferably a porous material that has been treated to have relatively hydrophobic properties in relation to liquid distribution media 82. The porous fluid distribution layer 68 serves dual functions, as previously discussed, including drawing liquids away from the electrode 66 (e.g. product water), while providing for uniform distribution and delivery of reactant gas to the electrode 66.

In certain preferred embodiments of the present invention, the average pore size of the fluid distribution layer 68 is larger than the average pore size of the liquid distribution media 82. The fluid distribution layer 68 is less hydrophilic than the adjacent liquid distribution media 82 (such that water is drawn out of the fluid distribution layer 68 into the liquid distribution media 82). The capillary force in a smaller pore size draws liquids into the liquid distribution media 82. One preferred type of porous fluid distribution layer 68 is constructed of graphite fibers, such as the TORAY® carbon paper, that has been dipped in a hydrophobic polymer solution, such as a solution comprising a casting solvent and polytetraflouroethylene (PTFE). The hydrophobicity of such a fluid distribution layer 68 is typically less than the hydrophobicity of the catalyst layer.

Product water enters the fluid distribution layer 68 from the cathode 66 due to a gradient of increasing hydrophilicity. The second side 92 of the fluid distribution layer 68 is placed adjacent to the more hydrophilic liquid distribution media 82, which further draws water away from the fluid distribution layer 68. Based on the gradient of hydrophilicity, water is driven away from the cathode electrode 66 and into the liquid distribution media 82. As discussed further below, in preferred embodiments of the present invention, the liquid distribution media 82 is treated to impart hydrophilic properties. In preferred embodiments of the present invention, the liquid distribution media 82 is designed to have smaller pore sizes and greater hydrophilicity to rapidly draw liquids out of the fluid distribution layer 68.

As shown in FIGS. 2 and 3, one preferred embodiment of the electroconductive element 70 according to the present invention has the liquid distribution media 82 covering substantially all of the major surface 84 of the electroconductive element 70, which corresponds to the electrically active area of the MEA 60. The impermeable conductive plate 80 forms the flow field of lands and grooves 74,76 that forms the gas flow channels 72 permitting ingress and egress of gas. The liquid distribution media 82 forms a layer along the major surface 84 overlaying the impermeable conductive plate 80, and the liquid distribution media 82 extends over the lands and grooves 74,76. In the present embodiment, the liquid distribution media 82 increases the area of electrical contact by increasing the surface area of the conductive material contacting the fluid distribution layer 68. Further, the liquid distribution media 82 contacts the fluid distribution layer 68 in the areas corresponding to the lands 74, which enhances the withdrawal of liquids that may collect over the lands 74. As previously discussed, the gas-liquid interface is also increased within the gas flow channels 72, due to a lining of high surface area porous liquid distribution media 82. Thus, liquids are drawn from the fluid distribution layer 68 to and through the porous material to regions of lower liquid concentration, which are likely to occur in areas where the liquids are being vaporized by interaction with gases passing over the porous material.

Figure 6:
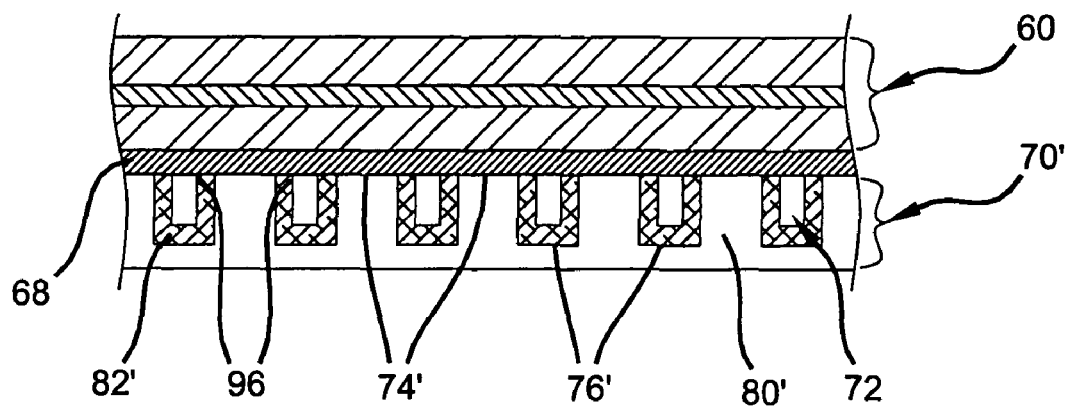
FIG. 6 is a partial cross-sectional view showing another preferred embodiment of the present invention of an electroconductive element comprising a liquid distribution media disposed along regions corresponding to grooves of a flow field comprising both lands and grooves, where the flow field is formed along a major surface of an impermeable electrically conductive plate.
Figure 7:
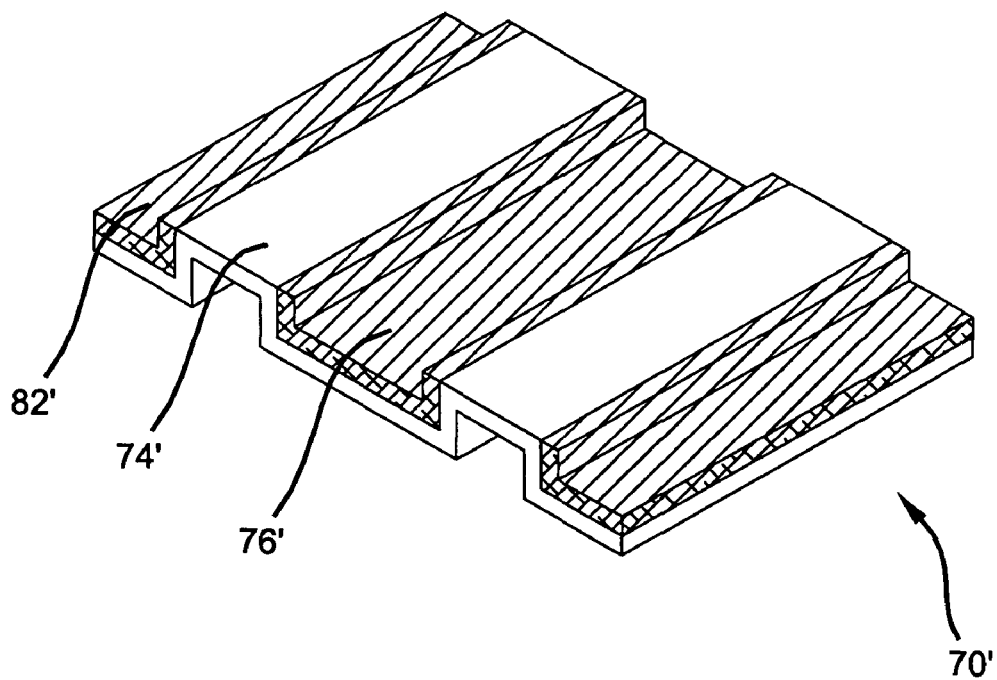
FIG. 7 is a partial isometric view of the embodiment of the electroconductive element shown in FIG. 6 comprising the liquid distribution media disposed along the regions corresponding to the grooves of the flow field comprising lands and grooves.

In one alternate preferred embodiment of the present invention, shown in FIGS. 6 and 7, the electroconductive element plate 70' is covered with liquid distribution media 82' only in the gas flow channels 72. The underlying impermeable conductive plate 80' has the lands 74' and grooves 76' formed therein to create the flowfield having gas flow channels 72 corresponding to the grooves 76'. In the present embodiment, the liquid distribution media 82' covers the regions corresponding to the grooves 76' or gas flow channels 72. Thus, the lands 74' of the impermeable conductive plate 80' remain uncovered and in direct contact with the fluid distribution layer 68. The liquid distribution media 82' is in contact with the fluid distribution layer 68 at terminal ends 96 of the liquid distribution media 82' to provide a transport path for liquid coming from the fluid distribution layer 68. The present embodiment provides a liquid distribution media layer 82' that draws water from the fluid distribution layer 68 and redistributes to dry areas within the material itself and/or into the passing gas stream flowing through the gas flow channels 72. In this embodiment, the electrical conduction path is from the fluid distribution layer 68 directly into the collector bipolar conductive plate 80' and the liquid distribution layer 82' need not be electrically conductive.

Figure 8:
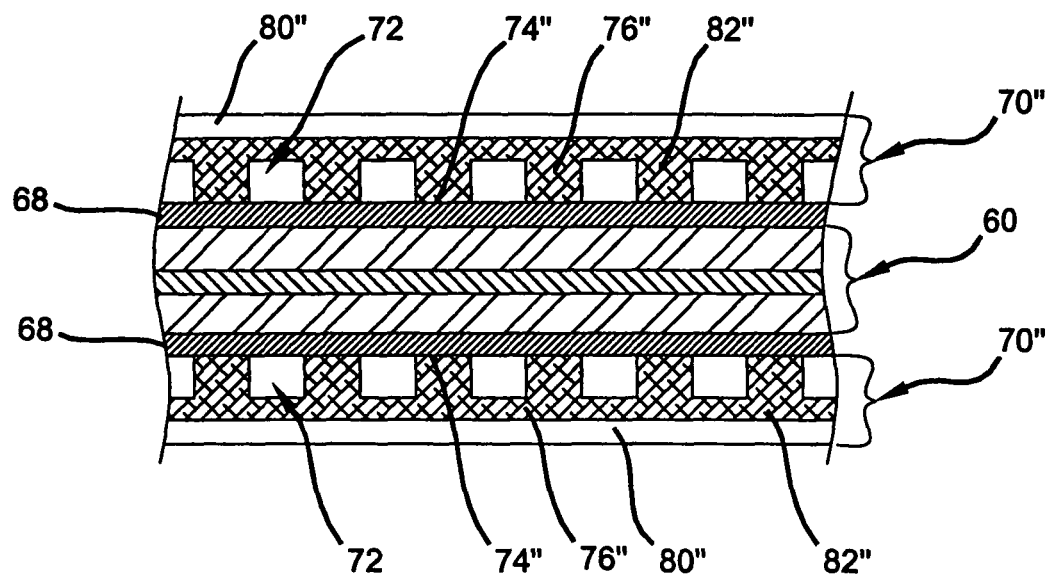
FIG. 8 is a partial cross-sectional view of one preferred embodiment of the present invention showing both an anode and a cathode of a MEA having two electroconductive elements comprising a liquid distribution media layer and an impermeable electrically conductive plate, wherein the flow field comprising lands and grooves is formed in a body of the liquid distribution media.

In an alternate preferred embodiment of the present invention shown in FIG. 8, the gas flow channels 72 are formed solely within the body of the liquid distribution media 82" of an electroconductive element 70". The electroconductive element 70" also comprises a flat or planar impermeable electrically conductive plate element 80". The electroconductive element 70" further comprises liquid distribution media 82" that overlays the flat impermeable conductive plate 80" in a relatively thick layer. Lands 74" and grooves 76" are formed within the liquid distribution media 82", to create gas flow channels 72 that form the flow field entirely within the liquid distribution media 82". Thus, an electrically conductive pathway is formed from the fluid distribution layer 68 through the bulk of the liquid distribution media 82" to the electrically conductive impermeable plate 80".

Figure 9:
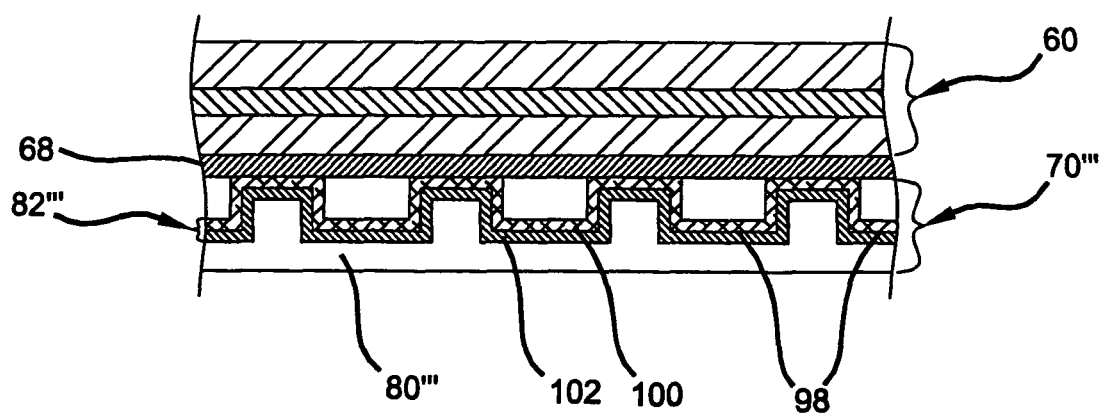
FIG. 9 is a partial cross-sectional view of one preferred embodiment of the present invention wherein the electroconductive element comprises a bi-layer liquid distribution media and an impermeable electrically conductive plate.

In FIG. 9, another alternate preferred embodiment according to the present invention is shown. An electroconductive element 70''' comprises an impermeable conductive plate element 80''' overlaid with the liquid distribution media 82'''. The liquid distribution media 82''' comprises multiple layers 98 of conductive, porous, material. Thus, in the embodiment as shown in FIG. 9, the liquid distribution media 82''' is a bi-layer structure constructed from a first layer 100 and a second layer 102 constructed from the preferred liquid distribution media materials previously discussed. One preferred aspect of the present invention includes the ability to create the first layer 100 having relatively high hydrophilicity and the second layer 102 having a lower hydrophilicity. Further, another advantage to having multiple layers 98 of liquid distribution media 82''' includes the ability to have different pore sizes in each layer 98, creating a gradient of porosity through the liquid distribution media 82'''. Thus, in preferred embodiments, the first layer 100 that contacts the fluid distribution media 68 has smaller pore sizes to enhance capillary pressure, for example, the average pore size in the first layer 100 may be from about 0.2 to about 10 µm. The second layer 102, that does not contact the fluid distribution layer 68, may have a relatively large pore size, for example, from between about 10 to about 30 µm. Thus, the second layer 102 has increased permeability with respect to the first layer 100, which translates to greater wicking velocity and mass transport, facilitating a more rapid redistribution of liquid within the liquid distribution media 82'''. As appreciated by one of skill in the art, multiple layers 98 having a variety of physical characteristics can be employed within the liquid distribution media 80''' of the present embodiment to enhance the liquid removal from the MEA 60 and fluid distribution layer 68.

Figure 10:
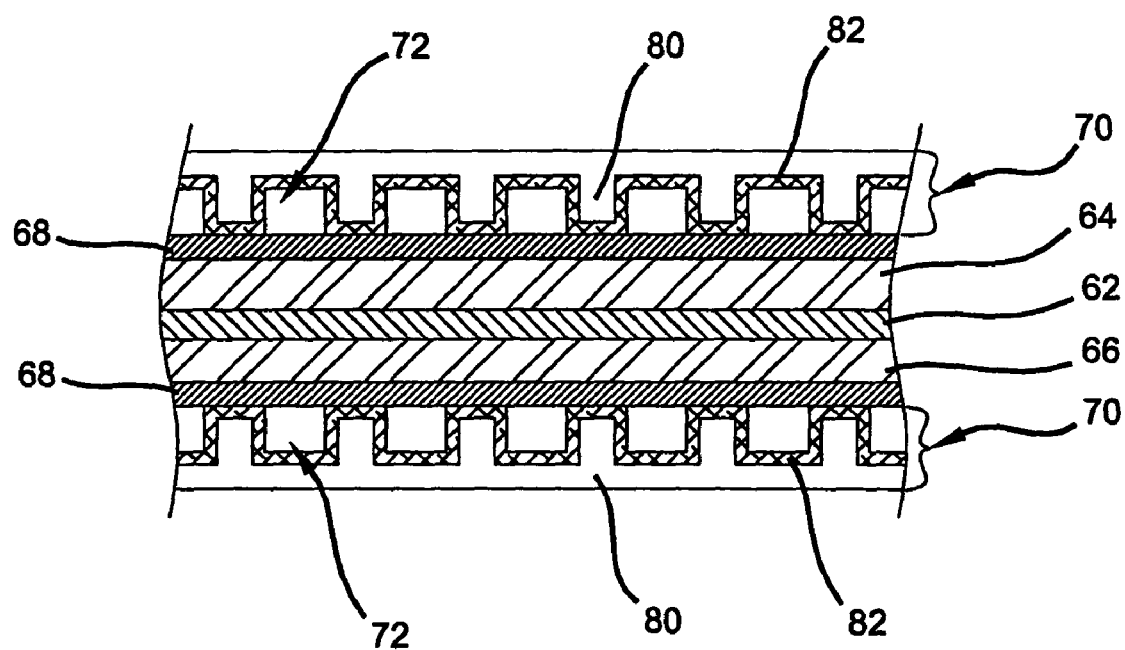
FIG. 10 is a partial cross-sectional view of another preferred embodiment of the present invention, showing both an anode and a cathode of a MEA, with each respective electrode having an electroconductive element comprising a liquid distribution media and an impermeable electrically conductive plate.

In certain previous embodiments, such as the one shown in FIG. 2, for example, a traditional flow field is formed on an electroconductive element 102 along the anode side 64, where the upper fluid distribution layer 68 touches lands 104 formed in the electroconductive element 102. In other preferred alternate embodiments of the present invention, the electroconductive element according to the present invention may be included on both the anode side 64 of the MEA 60, as well as the cathode side 66, as shown in FIGS. 8 and 10. Referring to FIG. 10, the anode 64 does not encounter the same issues with liquid water management as the cathode 66, in that product water is generated only on the cathode side 66. However, some liquid water can accumulate on the anode 64 side due to back diffusion through the membrane 62 and redistribution of this water is of benefit in improving performance and durability of the fuel cell. In the previous embodiments described above, the electroconductive element 70 comprises the liquid distribution media 82 to collect liquid water, redistribute to dry areas along the cathode 66, humidify the PEM 62, and vaporize or entrain the water in gas streams to remove the liquid from the fuel cell via gas flow channels 72. Humidification of the PEM 62 along the anode 64 is generally sufficient, as the thickness of a typical membrane 62 does not prohibit water vapor from moisturizing both sides of the membrane 62 (e.g. typical thicknesses are approximately 15~50 µm). However, if additional humidification or water management along the anode 64 is necessary, two electroconductive elements 70 comprising liquid distribution media layers 82 may be placed adjacent to both the anode and the cathode sides, 64,66, respectively, in lieu of a traditional electroconductive element (such as 102 of FIG. 2) on the anode 64.

Thus, both the anode and cathode 64,66 have electroconductive elements 70 comprising liquid distribution media 82 and the conductive impermeable plate 80 according to the present invention. Further, two fluid distribution layers 68 are preferably placed between the electroconductive element bipolar plates 70 and the anode and cathode 64,66 respectively to facilitate even gas distribution. Any configuration of electroconductive element plates 70 is feasible with the present embodiment, and the anode and cathode 64,44 may be similar or different embodiments of the electroconductive elements 70 having liquid distribution media 82. As shown in FIG. 10, the liquid distribution media 82 configurations are similar to the embodiment shown on the cathode 66 only in FIG. 2.

An electroconductive element 70 according to the present invention may be fabricated or constructed by various methods. One such method includes providing an impermeable electrically conductive element 80 having a major surface 84 overlaid by a conductive porous polymeric liquid distribution media 82. The impermeable electrically conductive element 80 may be made of conductive metal or a conductive composite. As previously discussed, the impermeable electrically conductive plate 80 may have the lands and grooves 74,76 formed therein prior to applying a liquid distribution media 82, and according to the present embodiment for making the electroconductive element 70, it is preferred that the flow field is pre-formed. A precursor of a liquid distribution media 82 is formed by mixing a pore forming constituent, such as for example, a salt, with a polymer solution. Preferably, the pore forming constituent salt is homogeneously mixed throughout the polymer solution and has a particle size of about 0.2 to 10 µm.

Further, in certain preferred embodiments, the liquid distribution media 82 is electrically conductive, while in other preferred embodiments, the liquid distribution media 82 does not require electrical conductivity (such as the embodiment shown in FIGS. 6 and 7). In such a configuration where the liquid distribution media 82 is not required to be conductive, the lands 74 may be masked while the liquid distribution media 82 precursor is applied. In embodiments where electrical conductivity is required, electrically conductive particles are added to the liquid distribution media 82 precursor mixture. The conductive particles enable electrical conductivity through the polymeric liquid distribution media 82. Such conductive particles may include electrically conductive particles (i.e., less than about 50 μm) dispersed throughout the polymer matrix. Typically this polymer matrix contains about 15% to about 80% by weight of solids, determined by the strength and conductivity requirements of the layer in a particular embodiment.

The electrically conductive particles are selected from the group consisting of: gold, platinum, graphite, carbon, nickel, conductive metal borides, nitrides and carbides (e.g., titanium nitride, titanium carbide, titanium diboride), titanium alloys containing chromium and/or nickel, palladium, niobium, rhodium, rare earth metals, and other noble metals. Most preferably, the particles will comprise carbon or graphite (i.e., hexagonally crystallized carbon). The particles comprise varying weight percentages of the polymer matrix forming the liquid distribution media 82 depending on both the conductive characteristics of the polymer itself (determining the extent of conductivity needed) and further the density and conductivity of the particles (i.e., particles having a high conductivity and low density can be used in lower weight percentages). Carbon/graphite containing conductive polymeric coatings will typically contain 25-50 percent by weight carbon/graphite particles. Preferred polymers useful with the present invention, include, by way of example, polypropylene, polyethylene, epoxies, silicones, polyamide-imides, polyether-imides, polyphenols, fluoro-elastomers (e.g., polyvinylidene fluoride), polyesters, phenoxy-phenolics, epoxide-phenolics, acrylics, and urethanes.

The liquid distribution media 82 precursor mixture is applied to the major surface 84 of the impermeable electrically conductive element 80, by any method known in the art, for example, by spray coating or doctor blade. After the liquid distribution media 82 precursor mixture is applied, the major surface 84 is treated to create the porous liquid distribution media 82. The appropriate treatment is dependent upon the pore forming constituent selected within the precursor mixture. For example, one preferred pore forming constituent is a salt which dissolves in solvent, such as sodium nitrate that dissolves in water. The electroconductive element 70 having the applied liquid distribution media 82 precursor is washed with water to the extent that the salt particles within the material are substantially dissolved and removed. The dissolved pore forming constituent leaves voids, or open pores, in the regions that it occupied within the liquid distribution media 82 layer, thus imparting porous properties into the material.

In another method of imparting porosity to the liquid distribution media 82, the pore forming constituent is selected such that it decomposes to form a gas upon application of heat, such as with ammonium bicarbonate salt, for example. The release of gases ruptures holes into the material, which forms the porous structure. After treating the precursor liquid distribution media 82 to impart porosity, the electroconductive element 70 is further treated by application of heat to cure the polymeric structure and permanently attach it to the major face 84 of the impermeable plate 80. Cross-linked polymers are preferred for producing impermeable coatings that provide corrosion-resistant properties for the underlying potentially corrosion susceptible substrates. Generally, curing or crosslinking is achieved by applying heat. In the case of a pore forming constituent salt that vaporizes, such as the ammonium bicarbonate, for example, the application of heat for curing can be combined with the application of heat to decompose and vaporize the salt. Preferred temperatures for curing are generally from the range of about 150° to about 300° C.

In certain preferred embodiments of the present invention, the liquid distribution media 82 may be treated to impart additional hydrophilic properties to the material. This may be performed by treating with etchant or by firing at high temperatures. Further, such treatment may include Chemical Vapor Deposition (CVD); Physical Vapor Deposition (PVD); or other electro-deposition methods that are used to coat three dimensional porous structures. CVD and PVD are well-known processes useful to coat a variety of conductive substrates. Deposited coatings are particularly advantageous because they can be quickly deposited in an automated process with little waste, and can be deposited substantially uniformly onto substrates. CVD is preferred for substrates having complex recessed surfaces like those preferred for the liquid distribution media 82 according to the present invention. The porous liquid distribution media 82 may be coated with a hydrophilic coating to a desired depth inward from the exposed surface. Such an electroconductive coating may comprise a metal oxide, a doped metal oxide, or other precious metals and their alloys, such as gold, niobium, or platinum.

In an alternate preferred method of forming an electroconductive element 70 according to the present invention, the liquid distribution layer 82 is formed of a sintered porous metal coating. The impermeable electrically conductive element 80 is preferably made of conductive metal and has the lands 74 and grooves 76 formed prior to applying the liquid distribution media 82. It is preferred that the flow channels 82 are formed by stamping or coining. A metal particle slurry or liquid distribution media 82 precursor is formed by mixing a polymer binder with metal particles. Preferably, the metal particles are homogeneously mixed with polymer in the metal particle slurry, and have a particle size of about 5 to 30 μm. The metal particle slurry is applied to the major surface 84 of the impermeable electrically conductive plate 80. The entire electroconductive element 70 is then fired by application of heat, preferably in the temperature range of about 400° to about 2000° F., at which temperature the binder is volatilized by the heat and removed and the metal particles are sintered to one another, as well as to the underlying impermeable plate to form a porous metal liquid distribution media 82 layer. Conductive metal particles useful for the present invention include niobium, gold, platinum, tantalum, and alloys thereof, as well as other metal alloys, such as stainless steel (e.g. 316) or INCONEL® metals, which are high strength austenitic nickel-chromium-iron alloys (e.g. INCONEL® 601). A non-limiting example of polymers useful as a binder for the present invention includes phenolics. An example of a reticulated porous metal foam coating that is commercially prepared and available, is sold under the trade name MET-PORE® from Porvair Fuel Cell Technologies of Henderson, N.C., and is useful with the present invention.

In an alternate preferred embodiment of the present invention, the porous liquid distribution media 82 of the electroconductive element 70 is formed by metal screens, cloth, mesh, foam, or the like. The impermeable conductive plate is preferably formed of a conductive metal plate, such as shimstock. A conductive metal mesh or screen, for example, which may be formed by multiple layers of material bonded together, is situated over the major face 84 of the impermeable plate 80. The screen is attached to the impermeable conductive plate (e.g. shimstock) 80, preferably by diffusion bonding or a similar process. The conductive metal screen forms a porous liquid diffusion layer 82. In preferred embodiments of the present invention, the lands 74 and grooves 76 that form the flow field along the major surface 84 are subsequently formed by stamping with a flowfield pattern die. Further, the present method of forming an electroconductive element 70 comprising a conductive liquid distribution media layer 82 is particularly well suited to bi-layer or multiple layer configurations (including 3 or more distinct layers) having different porosity and hydrophilicity, such as the one described in connection with FIG. 9 above. Also, it is preferred that the electroconductive elements 70 made according to the present method are subsequently treated to enhance hydrophilicity of the liquid distribution media 82, such as by CVD treatment to deposit a hydrophilic coating, as previously discussed.

Another preferred method of constructing an electroconductive element 70 comprising a liquid distribution media 82 includes treating the major surface 84 of the impermeable electrically conductive element 80 to enhance surface roughness. In such an embodiment, the impermeable electrically conductive element 80 of the electroconductive element 70 is preferably a metal. The surface 84 is treated to increase the surface area or roughness, so that there is a higher surface energy that will attract and transport water along the major surface 84. In preferred methods according to the present invention, the grooves 76 (flow channels 72) are etched, such as for example, by photolithographic etching. Then the surface is etched a second time with an aggressive etchant to create the desired level of surface roughness. A variety of etchants may be used to treat the surface of a metal substrate, as recognized by one of skill in the art. Preferred non-limiting etchants useful with the present invention include organic and inorganic acids having a pH of less than 3, and most preferably have a pH of less than 1. Particularly preferred non-limiting etchants in accordance with the present invention include sulfuric, nitric, hydrofluoric, ferric chloride, and mixtures thereof. The surface 84 may be then blasted by particulate to generate the necessary surface roughness. A non-limiting list of particulates that may be used for blasting include sand, glass, plastic beads (e.g. polymer beads), or nut shells. Thus, the roughened surface forms the liquid distribution media 82 along the major surface 84. It is preferred that the roughened surface is further treated to enhance hydrophilicity, such as by depositing electrophilic coatings by CVD, etching, or firing.

The present invention provides an improved system of water management along an electrode of a fuel cell, most particularly along the cathode side. The electroconductive element of the present invention comprises the liquid distribution media which provides a self-regulated water management system, where on the cathode side, the water is internally distributed within the liquid distribution media and further vaporized or entrained by the gases passing over the liquid distribution media. Thus, the water management system of the present invention enhances liquid water removal from the electrode and fluid distribution layer, and prevents flooding while facilitating greater water removal via vaporization and entrainment. The enhanced water management includes increased mass transport of water to regions of lower liquid concentration, which promotes higher fuel cell operational efficiency and lowers electrical resistance loss. Further, the water management system of the bipolar plate element according to the present invention provides even humidification of the PEM membrane, which promotes the durability and longevity of the membrane.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electrochemical cell having a membrane electrode assembly (MEA) comprising an anode and a cathode, the cell comprising:
   an electroconductive element comprising an impermeable electrically conductive element having a major surface facing the cathode, and an electrically conductive porous liquid distribution media disposed along said major surface defining flow channels comprising peaks corresponding to lands and grooves for transporting gas and liquid to and from the cathode;
   an electrically conductive fluid distribution layer disposed between said liquid distribution media and the cathode for transporting gases and liquids between the cathode and said flow channels; said fluid distribution layer and liquid distribution media constructed and arranged to transport liquids accumulating within the cathode through said fluid distribution layer and to and through said liquid distribution media, wherein said liquid distribution media is disposed on said peaks and contacts said fluid distribution layer in regions corresponding to said peaks to form an electrically conductive path between said impermeable electrically conductive element and said conductive fluid distribution layer, and wherein said fluid distribution layer is porous and has an average pore size larger than an average pore size of said porous liquid distribution media.

2. The electrochemical cell of claim 1, wherein said impermeable electrically conductive element and said liquid distribution media are arranged together to define said flow channels.

3. The electrochemical cell of claim 1, wherein said liquid distribution media is more hydrophilic than said fluid distribution layer.

4. The electrochemical cell of claim 1, wherein said liquid distribution media is disposed in regions along said major surface corresponding to an electrically active area defined by the MEA.

5. The electrochemical cell of claim 1, wherein said impermeable electrically conductive element is planar and a body of said liquid distribution media defines an undulated configuration of said peaks and valleys corresponding to said grooves which constitute said flow channels.

6. The electrochemical cell of claim 1, wherein said porous liquid distribution media has an average pore size in the range of from about 0.2 to about 30 micrometers.

7. The electrochemical cell of claim 1, wherein said liquid distribution media internally re-distributes liquid water thereby minimizing differences in humidity along a face of the MEA.

8. The electrochemical cell of claim 1, wherein said electroconductive element comprises a second impermeable electrically conductive element having a second surface facing the anode and a second liquid distribution media that is attached along regions of said second surface, and a second fluid distribution layer is disposed between said electroconductive element and the anode, wherein said second liquid distribution media contacts said second fluid distribution layer.

9. The electrochemical cell of claim 1, wherein said liquid distribution media comprises a first and a second layer wherein said first layer is in contact with said impermeable electrically conductive element and said second layer is in contact with said fluid distribution layer wherein said second layer is more hydrophilic than said first layer.

10. The electrochemical cell of claim 1, wherein said liquid distribution media comprises a first and a second layer wherein said first layer is in contact with said impermeable electrically conductive element and said second layer is in contact with said fluid distribution layer wherein said first layer has a larger average pore size than said second layer, such that liquid is transported at a higher rate in said first layer than in said second layer.

11. The electrochemical cell of claim 1, wherein said liquid distribution media has a first surface and a second surface, said first surface is in contact with the fluid distribution layer and has an undulating surface that corresponds to said flow channels, wherein said second surface is opposite to said first surface and meets with a surface of said impermeable electrically conductive element and is planar.

12. The electrochemical cell of claim 1, wherein said liquid distribution media is selected from the group consisting of: mesh, screen, and foam.

13. The electrochemical cell of claim 1, wherein said liquid distribution media is constructed of material selected from the group consisting of: carbon, graphite, polymers, stainless steel, chrome and alloys and mixtures thereof.

14. The electrochemical cell of claim 1, wherein said liquid distribution media is formed of materials that are cast, coated, or sprayed onto said major surface.

15. The electrochemical cell of claim 1, wherein said liquid distribution media comprises a conductive polymer or a non-conductive polymer with conductive particles distributed therein.

16. The electrochemical cell of claim 15, wherein said liquid distribution media is cured by application of heat.

17. The electrochemical cell of claim 1, wherein said liquid distribution media comprises a plurality of conductive metal particles selected from the group consisting of: stainless steel, niobium, nickel-chromium-iron alloy, and mixtures thereof.

18. The electrochemical cell of claim 17, wherein said liquid distribution media is formed by sintering said plurality of conductive metal particles by application of heat.

19. The electrochemical cell of claim 1, wherein said impermeable electrically conductive element comprises a compound selected from the group consisting of: aluminum, titanium, stainless steel, and alloys and mixtures thereof.

20. The electrochemical cell of claim 1, wherein said liquid distribution media is formed by etching said major surface.

21. An electrochemical cell having a membrane electrode assembly (MEA) comprising an anode and a cathode, the cell comprising:
an electroconductive element comprising an impermeable electrically conductive element having a major surface facing the cathode, and an electrically conductive porous liquid distribution media disposed along said major surface defining flow channels comprising peaks corresponding to lands and grooves for transporting gas and liquid to and from the cathode;
an electrically conductive fluid distribution layer disposed between said liquid distribution media and the cathode for transporting gases and liquids between the cathode and said flow channels; said fluid distribution layer and liquid distribution media constructed and arranged to transport liquids accumulating within the cathode through said fluid distribution layer and to and through said liquid distribution media, wherein said liquid distribution media is disposed on said peaks and comprises a first layer and a second layer arranged so that said first layer contacts said impermeable electrically conductive element and said second layer contacts said fluid distribution layer in regions corresponding to said peaks to form an electrically conductive path between said impermeable electrically conductive element and said conductive fluid distribution layer, and wherein said fluid distribution layer is porous and has an average pore size larger than an average pore size of said second layer of said porous liquid distribution media, and said first layer of said liquid distribution media is less hydrophilic than said second layer.

22. The electrochemical cell of claim 21, wherein said impermeable electrically conductive element and said liquid distribution media are arranged together to define said flow channels.

23. The electrochemical cell of claim 21, wherein said liquid distribution media is disposed in regions along said major surface corresponding to an electrically active area defined by the MEA.

24. The electrochemical cell of claim 21, wherein said impermeable electrically conductive element is planar and a body of said liquid distribution media defines an undulated configuration of said peaks and valleys corresponding to said grooves which constitute said flow channels.

25. The electrochemical cell of claim 21, wherein said liquid distribution media is selected from the group consisting of: mesh, screen, and foam.

26. The electrochemical cell of claim 21, wherein said liquid distribution media is constructed of material selected from the group consisting of: carbon, graphite, polymers, stainless steel, chrome and alloys and mixtures thereof.

27. The electrochemical cell of claim 21, wherein said liquid distribution media is formed of materials that are cast, coated, or sprayed onto said major surface.

28. The electrochemical cell of claim 21, wherein said liquid distribution media comprises a conductive polymer or a non-conductive polymer with conductive particles distributed therein.

29. The electrochemical cell of claim 28, wherein said liquid distribution media is cured by application of heat.

30. The electrochemical cell of claim 21, wherein said liquid distribution media comprises a plurality of conductive metal particles selected from the group consisting of: stainless steel, niobium, nickel-chromium-iron alloy, and mixtures thereof.

31. The electrochemical cell of claim 30, wherein said liquid distribution media is formed by sintering said plurality of conductive metal particles by application of heat.

32. An electrochemical cell having a membrane electrode assembly (MEA) comprising an anode and a cathode, the cell comprising:
an electroconductive element comprising an impermeable electrically conductive element having a major surface facing the cathode, and an electrically conductive porous liquid distribution media disposed along said major surface defining flow channels comprising peaks corresponding to lands and grooves for transporting gas and liquid to and from the cathode;
an electrically conductive fluid distribution layer disposed between said liquid distribution media and the cathode for transporting gases and liquids between the cathode and said flow channels; said fluid distribution layer and liquid distribution media constructed and arranged to transport liquids accumulating within the cathode through said fluid distribution layer and to and through said liquid distribution media, wherein said liquid distribution media is disposed on said peaks and contacts said fluid distribution layer in regions corresponding to said peaks to form an electrically conductive path between said impermeable electrically conductive element and said conductive fluid distribution layer and wherein said liquid distribution media comprises a material selected from the group consisting of: mesh, screen, foam, and sintered metal.

33. The electrochemical cell of claim 32, wherein said liquid distribution media comprises a first and a second layer wherein said first layer is in contact with said impermeable electrically conductive element and said second layer is in contact with said fluid distribution layer in regions corresponding to said peaks, wherein said second layer is more hydrophilic than said first layer.

34. The electrochemical cell of claim 32, wherein said impermeable electrically conductive element and said liquid distribution media are arranged together to define said flow channels.

35. The electrochemical cell of claim 32, wherein said liquid distribution media is disposed in regions along said major surface corresponding to an electrically active area defined by the MEA.

36. The electrochemical cell of claim 32, wherein said impermeable electrically conductive element is planar and a body of said liquid distribution media defines an undulated configuration of said peaks and valleys corresponding to said grooves which constitute said flow channels.

37. The electrochemical cell of claim 32, wherein said liquid distribution media is constructed of material selected from the group consisting of: polymers, stainless steel, chrome and alloys and mixtures thereof.

38. The electrochemical cell of claim 32, wherein said liquid distribution media is formed of materials that are cast, coated, or sprayed onto said major surface.

39. The electrochemical cell of claim 32, wherein said liquid distribution media comprises a conductive polymer or a non-conductive polymer with conductive particles distributed therein.

40. The electrochemical cell of claim 39, wherein said liquid distribution media is cured by application of heat.

41. The electrochemical cell of claim 32, wherein said liquid distribution media comprises a plurality of conductive metal particles selected from the group consisting of: stainless steel, niobium, nickel-chromium-iron alloy, and mixtures thereof, that are sintered to form said liquid distribution media.

42. The electrochemical cell of claim 21, wherein said liquid distribution media has an average pore size of about 0.2 to about 30 micrometers.

* * * * *